United States Patent
Lowth et al.

(10) Patent No.: US 9,957,842 B2
(45) Date of Patent: May 1, 2018

(54) METHOD AND APPARATUS FOR SUPPORTING BLADES

(71) Applicant: ROLLS-ROYCE PLC, London (GB)

(72) Inventors: Stewart Lowth, Nottingham (GB); Christopher Faulkner, Northamptonshire (GB)

(73) Assignee: ROLLS-ROYCE plc, London (GB)

( * ) Notice: Subject to any disclaimer, the term of this patent is extended or adjusted under 35 U.S.C. 154(b) by 0 days. days.

(21) Appl. No.: 14/498,264

(22) Filed: Sep. 26, 2014

(65) Prior Publication Data
US 2015/0107108 A1    Apr. 23, 2015

(30) Foreign Application Priority Data
Oct. 23, 2013    (GB) .................................. 1318695.2

(51) Int. Cl.
*F01D 5/00* (2006.01)
*F01D 25/28* (2006.01)
*F01D 5/30* (2006.01)
*B23P 15/02* (2006.01)

(52) U.S. Cl.
CPC ............ *F01D 25/285* (2013.01); *B23P 15/02* (2013.01); *F01D 5/005* (2013.01); *F01D 5/3061* (2013.01); *F05D 2230/10* (2013.01); *F05D 2230/80* (2013.01); *Y10T 29/49318* (2015.01)

(58) Field of Classification Search
CPC ............ F05D 2230/72; F05D 2230/80; F05D 2230/90; F05D 2230/10–2230/18; B23P 6/002; B23P 6/045; F01D 5/005; F01D 25/285
See application file for complete search history.

(56) References Cited

U.S. PATENT DOCUMENTS

| | | | |
|---|---|---|---|
| 4,729,804 A | 3/1988 | Dillner | |
| 4,822,013 A | 4/1989 | Johnson | |
| 4,951,390 A * | 8/1990 | Fraser | B23K 37/0443 |
| | | | 29/402.21 |
| 5,755,031 A | 5/1998 | Baumgarten et al. | |

(Continued)

FOREIGN PATENT DOCUMENTS

| | | | |
|---|---|---|---|
| DE | 102007020957 A1 | 11/2008 | |
| WO | 03068457 A1 | 8/2003 | |
| WO | WO 2011/110167 A1 * | 9/2011 | ............. B23Q 3/084 |

OTHER PUBLICATIONS

United Kingdom Search Report issued in GB1318695.2 dated Jun. 13, 2014.

(Continued)

*Primary Examiner* — Christopher Besler
(74) *Attorney, Agent, or Firm* — Oliff PLC

(57) ABSTRACT

A method of supporting a cantilevered component prior to machining the cantilevered component, wherein the cantilevered component is mounted on a hub, the method comprising the step of providing an adhesive carrier, applying adhesive to the carrier and adhering the carrier to the cantilevered component and allowing the adhesive to cure. The carrier may rigid and braced against adjacent blades or against another carrier located on an opposing side of the aerofoil. Alternatively, the carrier may be a flexible fabric that can be wrapped around the blade. Advantageously, the blade can be machined through the carrier.

8 Claims, 6 Drawing Sheets

(56) References Cited

U.S. PATENT DOCUMENTS

| | | | |
|---|---|---|---|
| 5,867,885 A | 2/1999 | Bales et al. | |
| 8,459,942 B2* | 6/2013 | Sjunnesson | F01D 5/3023 |
| | | | 415/191 |
| 2005/0205644 A1 | 9/2005 | Meier | |
| 2006/0051211 A1* | 3/2006 | Ferte | B23K 20/129 |
| | | | 416/213 R |
| 2008/0035179 A1 | 2/2008 | Clark et al. | |
| 2009/0025220 A1 | 1/2009 | Fessler-Knobel | |
| 2013/0160940 A1 | 6/2013 | Fessler-Knobel et al. | |

OTHER PUBLICATIONS

Feb. 23, 2015 Search Report issued in European Application No. 14186585.

* cited by examiner

METHOD AND APPARATUS FOR SUPPORTING BLADES

TECHNICAL FIELD OF INVENTION

The present invention relates to methods of supporting cantilevered components on a hub and particularly blades mounted to a rotor disc, drum or ring for machining. The invention particularly relates to methods of temporarily supporting the aerofoils and preferably aerofoils integrally formed on the disc, drum or ring.

BACKGROUND OF INVENTION

With reference to FIG. 1, a ducted fan gas turbine engine generally indicated at 10 comprises, in axial flow series, an air intake 1, a propulsive fan 2, an intermediate pressure compressor 3, a high pressure compressor 4, combustion equipment 5, a high pressure turbine 6, an intermediate pressure turbine 7, a low pressure turbine 8 and an exhaust nozzle 9.

Air entering the air intake 1 is accelerated by the fan 2 to produce two air flows, a first air flow into the intermediate pressure compressor 3 and a second air flow that passes over the outer surface of the engine casing 12 and which provides propulsive thrust. The intermediate pressure compressor 3 compresses the air flow directed into it before delivering the air to the high pressure compressor 4 where further compression takes place.

Compressed air exhausted from the high pressure compressor 4 is directed into the combustion equipment 5, where it is mixed with fuel that is injected from a fuel injector 14 and the mixture combusted. The resultant hot combustion products expand through and thereby drive the high 6, intermediate 7 and low pressure 8 turbines before being exhausted through the nozzle 9 to provide additional propulsive thrust. The high, intermediate and low pressure turbines respectively drive the high and intermediate pressure compressors and the fan by suitable interconnecting shafts.

The fan, compressor and turbine sections have alternating, axially spaced arrays of rotatable blades and static vanes. The rotatable blades are mounted to a disc, drum or ring either through attachment features, where a shaped element is secured in a complementary feature, or integrally, where the blade is formed with, or integrally joined to, the disc, drum or ring. For convenience in the rest of the specification the description and claims will refer to a disc but this term should be considered to extend to drums and rings. The term "integrally bladed rotor", or IBR should also be considered to extend to integrally bladed drums (blums), integrally bladed discs (blisks) and integrally bladed rings (blings).

Integrally bladed rotors are rotors having integrally formed, or attached blades extending radially outwards from their circumference. The integrally bladed rotors are lighter than a similar component with detachable blades and offer superior airflow, tolerance and strength characteristics. Despite these advantages IBRs are not routinely used because damage to one blade could result in the entire rotor being scrapped.

Processes to rebuild or repair IBRs are now being developed but the processes leave a surface finish that is not optimum. It is therefore necessary to finish machine the surfaces to restore to an appropriate surface finish. Given that the aerofoils of the IBR are cantilevered any machining operation can be susceptible to vibration/chatter that also affects the final surface of the component. Due to the relatively narrow gap between blades and due to the need to have full 360 degree access to the blade conventional fixturing methods cannot be used to support the blade during the machining process.

It is an object of the present invention to seek to provide an improved method of supporting an aerofoil during machining.

STATEMENTS OF INVENTION

According to a first aspect of the invention there is provided a method of supporting a cantilevered component prior to machining the cantilevered component, wherein the cantilevered component is mounted on a hub, the method comprising the step of providing an adhesive carrier, applying adhesive to the carrier and adhering the carrier to the cantilevered component and allowing the adhesive to cure.

The carrier is braced against a further cantilevered component. Preferably the carrier is rigid and comprises a first wing for adhering to a first surface of the cantilevered component and a second wing for adhering to a first surface of the further cantilevered component. A base may connect the first and second wings.

Preferably the first wing is adhered to the cantilevered component with a stronger bond than the second wing is adhered to the further cantilevered component. The first bond may be provided by a high strength structural adhesive such as epoxy, polyurethane or methacrylate. The second bond may be provided by a low tack adhesive such as a hot melt glue, or a high friction rubber that inhibits movement of the second wing relative to the further cantilevered component.

The carrier may be braced against a further carrier. The carrier may be adhered to a first surface of the cantilevered component and the further carrier is adhered to a second surface of the cantilevered component. Preferably the carrier is braced to the further carrier around an edge of the cantilevered component.

The carrier may be flexible and wrapped around the cantilevered component. The adhesive, preferably a high strength structural adhesive such as epoxy, polyurethane or methacrylate, ma be applied whilst the carrier is wrapped around the cantilevered component.

Preferably the cantilevered component and the further cantilevered component is a blade mounted to a hub. The blade is preferably integrally mounted to the hub to provide an integrally bladed disc, integrally bladed drum or integrally bladed ring. Alternatively the blade is replaceable and mounted to the hub through an attachment feature Preferably, following adherence of the carrier to the cantilevered component the cantilevered component or blade is machined. The carrier remaining attached to the blade or component during at least part of the machining process.

According to a second aspect of the invention there is provided a carrier for supporting a blade mounted on a hub, the carrier having two spaced wings connected by a base, each wing having an internally facing surface facing the opposing wing and an outwardly facing surface facing away from the opposing wing, at least one of the outwardly facing surfaces being configured to receive an adhesive.

According to a further aspect of the invention there is provided a carrier for supporting a blade mounted on a hub, the carrier having two halves, each half having a surface configured to receive an adhesive for adhering to a respective side of the blade and a connector portion that engages with the connector portion of the other half to secure the halves together.

Preferably the surface configured to receive an adhesive comprises a plurality of depressions separated by a plurality of lands. The surface configured to receive an adhesive may further comprise an adhesive break, the adhesive break having a channel and a ridge extending across the width of the surface.

DETAILED DESCRIPTION OF INVENTION

Figure 1:
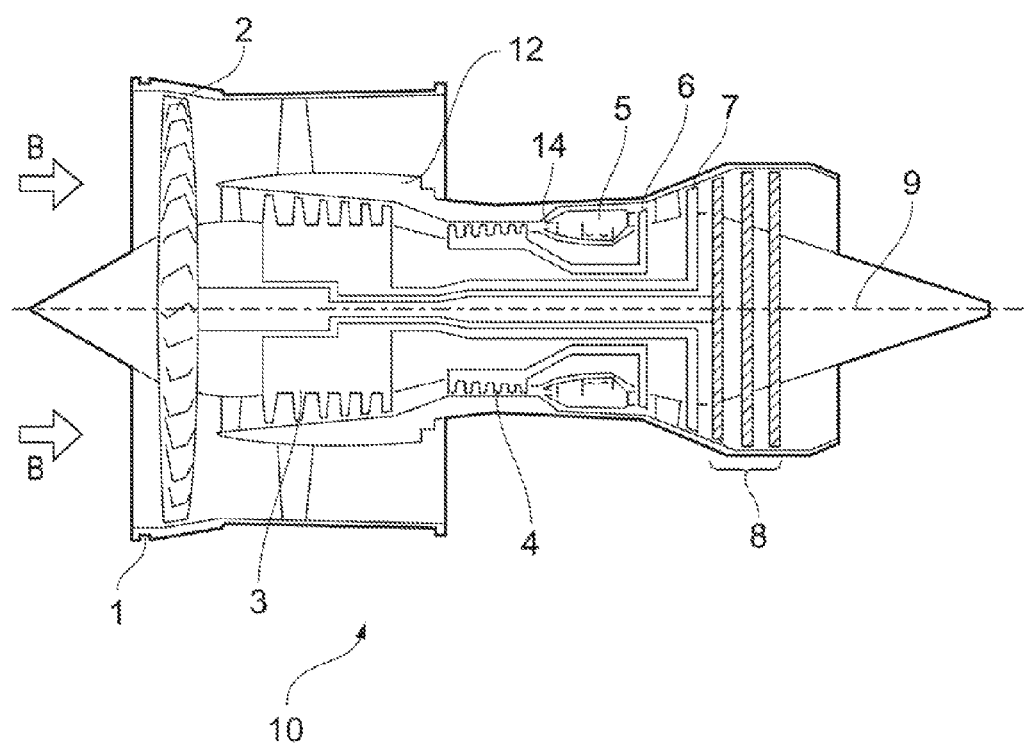
FIG. 1 depicts a gas turbine engine incorporating a rotor for supporting in accordance with the present invention.
Figure 2:
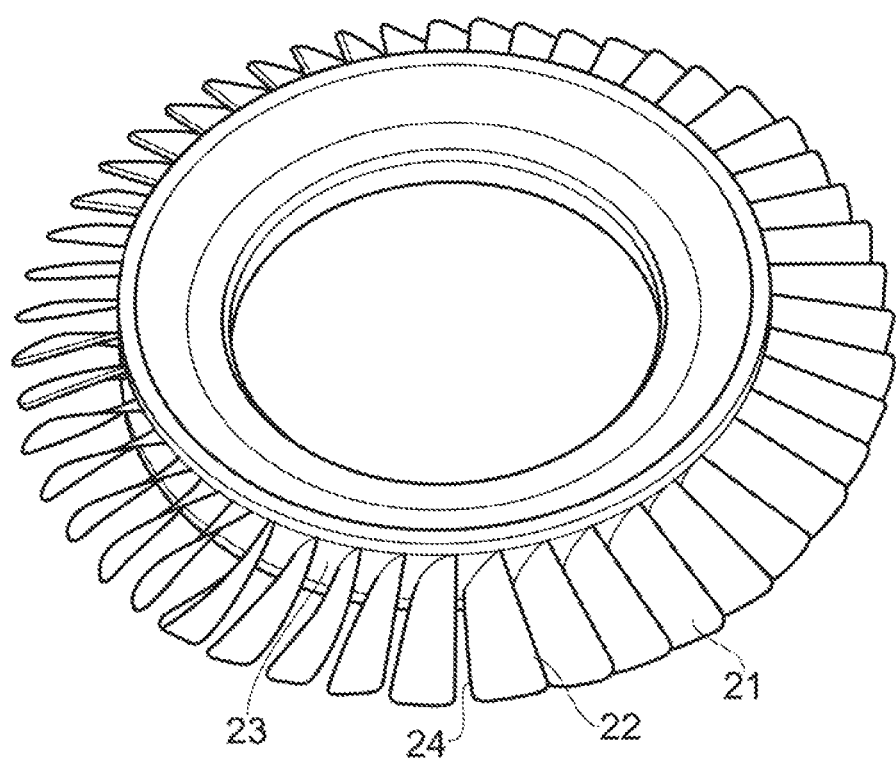
FIG. 2 depicts an integrally bladed rotor for supporting in accordance with the present invention.

FIG. 2 shows an enlarged view of a one-piece compressor rotor arrangement including an annular base body and several circumferentially distributed blade or aerofoil elements extending essentially radially from the base body. The one-piece component removes the need for blade roots and disc slots and allows the blades to be spaced closer together.

If one of the blades is damaged either during manufacture or in use it is necessary to either remove and replace the blade or repair it in situ. Replacement of the blade involves cutting through the blade to leave a stub and subsequently welding a new blade onto the stub. Repair of the blade typically involves removing a portion of the blade or aerofoil to leave a notch, reforming a new portion as a patch either by direct replacement or by build up welding within the notch and then machining the patch to the desired profile.

Access to the aerofoil to machine the surface is difficult due to the proximity of adjacent blades and it is difficult to support the blade in addition to allow access of the machine tool.

A support is applied to the blades to temporarily increase their stiffness and change their vibration characteristics in order to reduce chatter of the aerofoil that can, in severe instances, damage the aerofoil but is more likely to affect the uniformity of the machined finish.

The support can be a sacrificial component that is secured to the blade to be machined by an adhesive or encapsulant. The support may be braced against a further sacrificial component or an adjacent blade to stiffen the blade to be machined.

Figure 3:
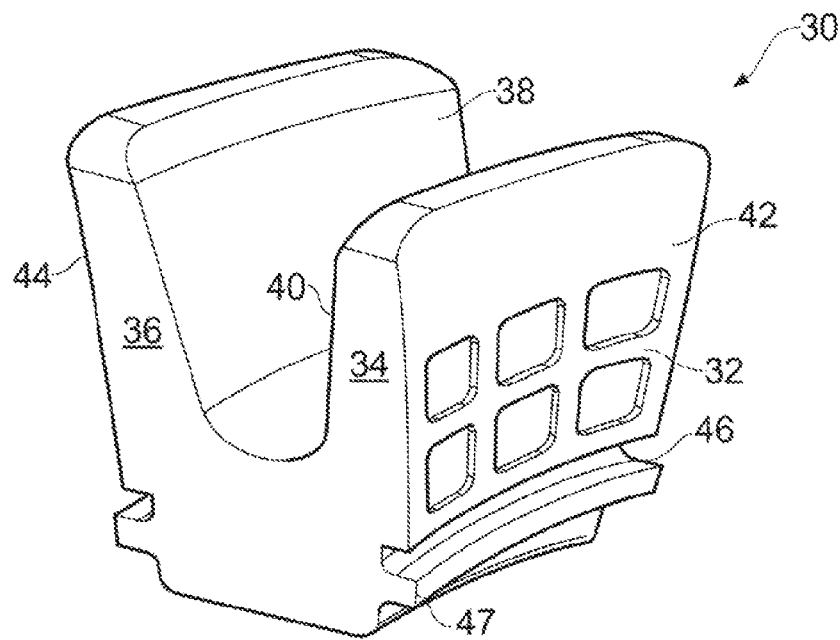
FIGS. 3 and 4 depict a carrier in accordance with a first embodiment of the invention.
Figure 4:
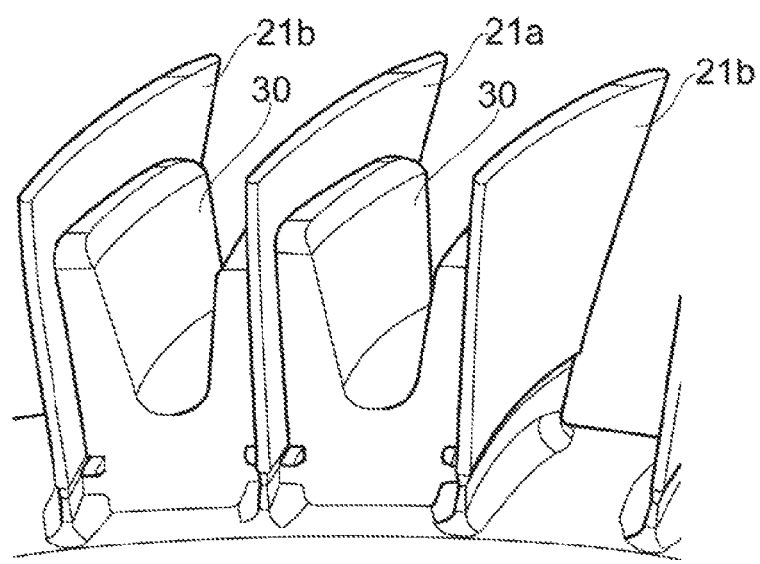

FIGS. 3 and 4 depict a first embodiment of a support 30 which may be used to support the side of a blade mounted to a hub. The support is generally "V" shaped with the opposing side walls 34, 36 having internally facing surfaces 38, 40 which face each other across a gap and outwardly facing surfaces 42, 44 that are configured to fit against adjacent blade surfaces.

Each of the outwardly facing surfaces 42, 44 is provided with a lattice 32 that comprises walls and pockets, the pockets adapted to receive an adhesive. A groove 46 runs along the length of the support and is designed to receive excess adhesive and helps to prevent an overflow of adhesive onto the underside of the support which may disadvantageously bond the support to the hub.

The support is secured to the blade by applying a high-adhesion structural adhesive such as epoxy, polyurethane or methacrylate to the face 42. A roller, squeegee or other appropriate applicator may be used. The other outer face 44 has a low adhesion, peelable adhesive such as hot melt glue applied to it by any appropriate method. The adhesive may be in sheet or liquid form.

The support is brought into contact with the blade to be machined with the surface having the high-adhesion structural adhesive contacting the blade. The surface of the support that carries the low adhesion adhesive abuts a blade adjacent to the one to be machined. Excess adhesive on either of the outer faces can flow into the lattice pockets.

It is desirable for a support to be applied to both sides of a blade to be machined. If it is deemed necessary to machine consecutive blades in an array then it is possible to apply high-adhesion adhesive to both outer surfaces of the support.

As shown in FIG. 4, once the support is in place and the adhesive cured the blade to be machined 21a is supported on both its suction and pressure flanks the supports being braced against the adjacent blades 21b. The stiffness of the adjacent blades help to shore up the blade to be machined.

The blade can be machined with the machining operation removing at least a part of the support that is bonded to its surface. The blade can be machined on a 5-axis milling machine and as the blade surface resides under the support structure the tool cuts straight through this, swarfing the adhesive interface between the blade and plastic structure The "V" shape of the support advantageously removes the requirement to carry out machining operations for creating cutter clearance prior to final blade surface machining. The support may not need to have a "V" shape to provide the clearance. For example, a slot could be milled into the support before the final machining operation on the blisk is performed. Once the machining is complete the support can be fully removed. This is achieved by machining or cutting away the outer surface that faces the machined blade to a point at which there is no structural adhesive. In practice, this comprises removing the support down to at least the groove 46 but may also involve removing the flange 47. The outer surface facing the bracing blade can be pulled or peeled from the bracing blade as the adhesive, if used, has relatively low tack.

The support is preferably of a low cost plastic material that can be injection moulded or produced by 3D printer. The material should be cheap as the support is disposable and soft enough to be machined as part of the machining process without damaging either the surface of the blade or the machine tool. However, if more strength is required the support may be formed of metal e.g. investment cast, die cast, or laser sintered. Alternatively, the support may be plastic reinforced with metal or ceramic in rod or particulate form.

In some arrangements the low-tack adhesive will not be required to secure the support to the bracing blade, the opposing arm could be sprung to provide sufficient outward force to brace the support.

Figure 5:
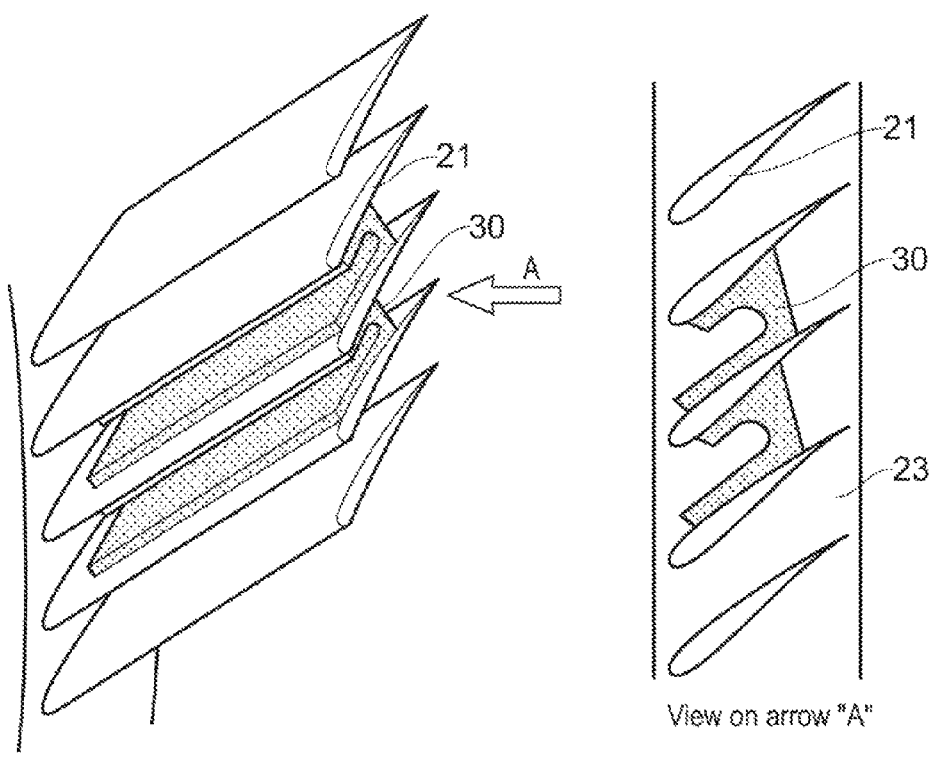
FIG. 5 depict a carrier in accordance with an alternative embodiment of the invention.

In an alternative arrangement, shown in FIG. 5, the support is rotated such that it runs the span of the blade rather than along the blade chord. The arrangement is advantageous particularly where the blades are long, or where it is just the leading or trailing edges of the blade that require machining. The high adhesion adhesive may not be used over the whole of the outer surface facing the blade to be machined with some of the outer surface being left adhesive free or provided with a low-tack adhesive.

Figure 6:
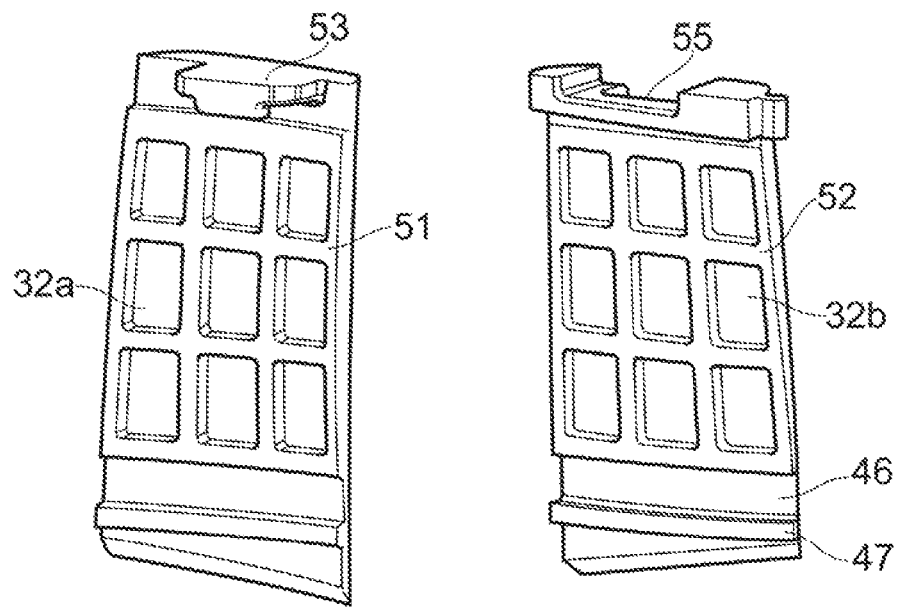
FIGS. 6 and 7 depict a carrier in accordance with a further embodiment of the invention.
Figure 7:
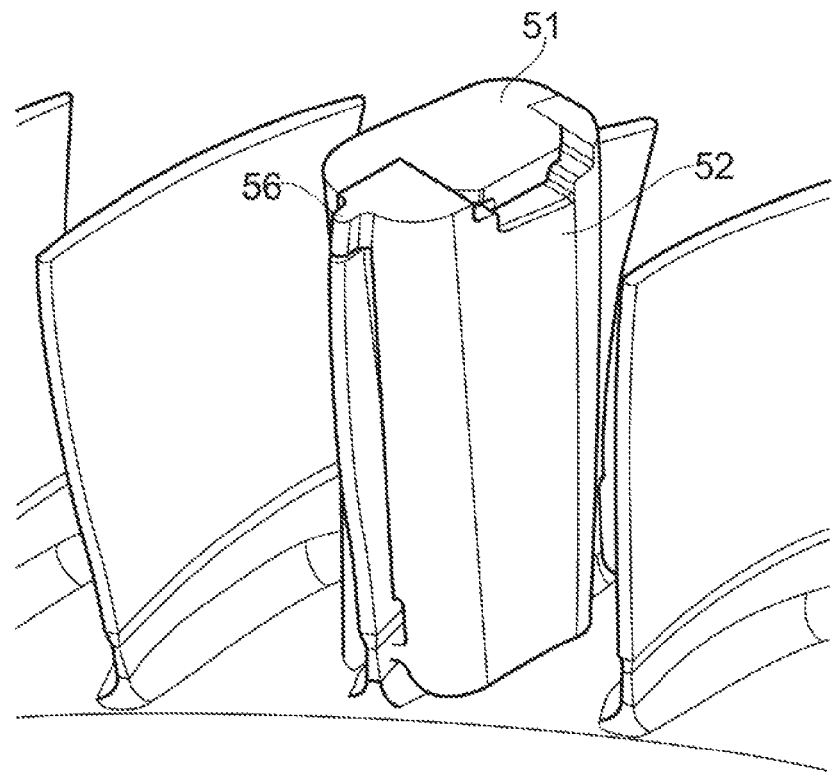
Figure 8:
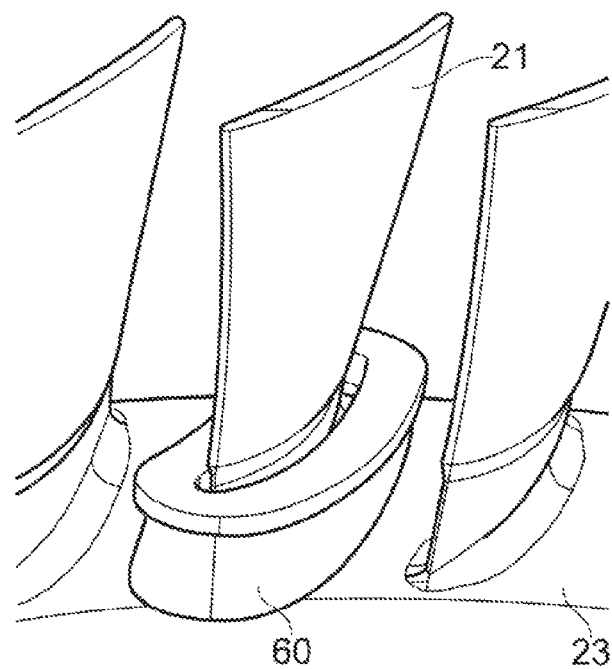
FIGS. 8 and 9 depict a carrier in accordance with a further embodiment of the invention.
Figure 9:
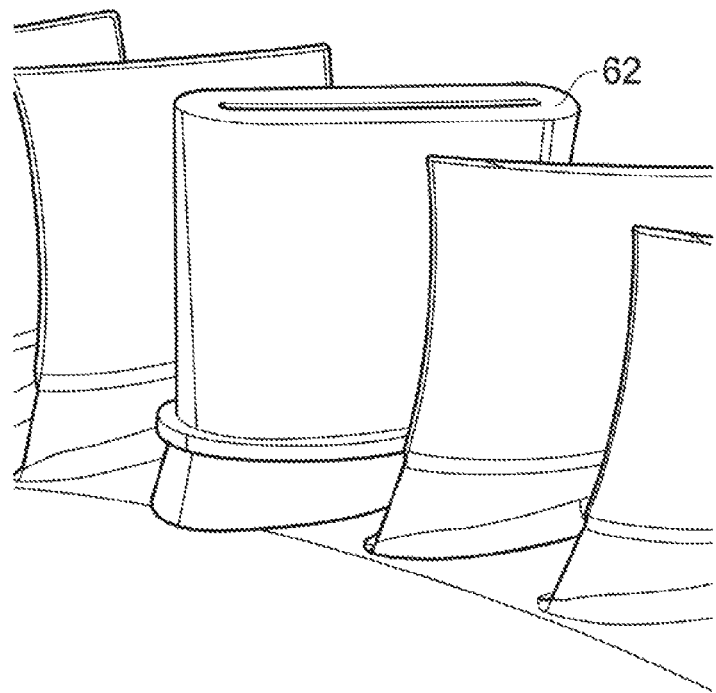

In a further embodiment the support is provided by structural arrangements that brace against each other around the blade. One example is depicted with reference to FIGS. 6 and 7. The support is formed in two parts 51, 52, one part being formed with a latch 53 and the other a catch 55. One surface of each of the parts is provided with a lattice 32a, 32b to which an adhesive is applied with a groove 46 and a ridge 47 helping to ensure that adhesive is not transferred to a position between the ridge and the hub 23.

The two parts can be snapped together before being slid over the blade to be machined or the parts can be brought into contact with the blade and then snapped together to form a cassette. A reference marker 56 is provided to align the cassette with the leading and/or trailing edge of the blade. The marker is a projection that is shaped to correspond to the leading or trailing edge to that the alignment can be checked visually or by inserting the leading edge and projection against an appropriate reference surface.

Once aligned the adhesive is allowed to cure and the finish milling operation can be performed to machine away the clip and the adhesive with the remnants of the clip detaching from the blade once the depth of the unglued section is reached by the machining operation.

The dimension of the cassette is such that cassettes may be placed on adjacent blades without contacting the adjacent cassettes.

In the embodiment shown the cassette leaves the leading and trailing edges uncovered. It will be appreciated that the cassette may extend beyond the leading and trailing edges and this will permit further or other locations for catches and latches to secure the two parts together. Hinges may be provided between the parts to allow them to be formed together rather than as separate components.

The support is preferably of a low cost plastic material that can be injection moulded or used in a 3D printer. The material should be cheap as the support is disposable and soft enough to be machined as part of the machining process without damaging either the surface of the blade or the machine tool. However, if more strength is required the support may be formed of metal e.g. investment cast, die cast, or laser sintered. Alternatively, the support may be plastic reinforced with metal or ceramic in particulate or rod form.

In a further embodiment the support is provided by a flexible carrier impregnated with at adhesive encapsulant. A shaped rubber grommet 60 is provided around the blade to be machined. The grommet protects the hub 21 from contacting the adhesive used in the support. As an alternative a liquid maskant or a rubber sheet that has a plurality of blade receiving apertures that allows it to span multiple blades could be placed between over the hub.

A fabric, pre-impregnated with an adhesive is wound round the blade or, if in the form of a sock, placed over the blade and allowed to cure to solidify the fabric to the blade. If the fabric is not pre-impregnated it can be wound round the blade with one or more applications of adhesive by brushing, spraying or dipping at appropriate intervals during the layering of the fabric.

Once sufficient layers have been provided the adhesive is allowed to cure to provide a support 62 ready to support the blade during machining of the blade.

As an alternative to the fabric, with may be of cotton or a synthetic weave a foam or sponge may be used that could solidify with the foam to create a strong matrix composite. Advantageously this could be applied in a single layer that avoids the need for multiple layers and which could speed up the repair process Synthetic fabrics such as knitted fibreglass or carbon fibre can be impregnated with polyurethane are flexible enough to allow accurate moulding to the blade. The fabric with the polyurethane can cure quickly to provide a rigid support.

Once the blade is fully supported it is possible to machine it such that the blade machining generates reduced chatter or vibration. The machining operation takes places through the support, destroying the support where it interfaces to the blade. Possible additional machining operations could be used to give increased cutter clearance or reduce cutting load. The general intention is to give the blade to be machined as much support as possible, only removing excess material when absolutely necessary. For instance the part of the 'clip' show in FIG. 7 above the tip of the blade would be milled away before machining of the blade, to reduce cutter load for initial blade machining. Then, when machining is completed, any remains of the structure can be removed. The milling process is the most suitable for this type of operation.

It will be appreciated that the invention has been described primarily with respect to integrally bladed rotors but that it will find application in rotors with removable blades and aerofoils where it is desired that the blade or aerofoil remains attached to the disc during machining.

The arrangement could also be used for applications other than aerospace, for example ship or submarine propellers, heat exchanger fins, or elsewhere a cantilevered device may require temporary support during machining.

Traditional mechanical fixtures can be very expensive to design, manufacture and maintain. Advantageously, the fixturing systems proposed herein are relatively cheap and simple to manufacture.

Because the adhesives take up surface imperfections the methods proposed herein are well suited to fixturing friction welded blisks that are assembled from forgings since these generally have a less predictable blade profile before machining.

The process and equipment used in the repair can be standardised as the same basic equipment and process can be used for virtually any blade.

As a traditional mechanical fixture requires a fixed clamping position to hold the blade this can obstruct the machining operation. As the encapsulant is machined away as part of the machining process the likelihood of obstructing the tool access is eliminated.

The cups, sleeves or other fixturing devices can be formed using a 3D printer that allows designs suitable for legacy or development blades. The data can be stored digitally and recalled as needed. The cups, sleeves or other fixtures may be manufactured based on data taken from the repaired blade. The space between the blade and the cup can be kept small which can reduce the risk of the encapsulant coming away from the blade caused by shrinkage and which can be a problem if sufficient encapsulant is applied to extend entirely between adjacent blades.

As each blade is separately braced, or at most braced with an adjacent blade, the bracing can be applied to all the repaired blades of the blisk in a separate process that allows blades to be machined sequentially once the blisk is mounted to the machining fixture. The bracing is low profile which can allow the blisk to rotate without having to remove it from the machining fixture.

It will be appreciated that a number of different embodiments are described and the skilled person will appreciate that features of each embodiment could be combined with features of one or more of the other embodiments as appropriate or as required without departing from the invention described herein.

The invention claimed is:

1. A method of supporting a cantilevered component prior to machining the cantilevered component, wherein the cantilevered component is mounted on a hub and has a leading edge, a trailing edge and a first flank connecting the leading edge and the trailing edge and a second flank connecting the leading edge and the trailing edge, the first flank facing a second flank of a further cantilevered component, the method comprising the steps of:
   providing an adhesive carrier, the adhesive carrier being rigid and comprising a first wing shaped to adhere directly to the first flank of the cantilevered component and a second wing shaped to adhere directly to the second flank of the further cantilevered component;
   wherein the adhesive carrier is "V" shaped with each wing having a surface that faces the other wing and each wing having a second surface facing away from the other wing, the second surface of the second wing fitting directly against the second flank of the further cantilevered component;
   applying adhesive to the adhesive carrier and adhering the adhesive carrier to the cantilevered component and the further cantilevered component; and
   allowing the adhesive to cure such that the second surface of the first wing is adhered directly to the first flank of the cantilevered component and the second surface of the second wing is adhered directly to the second flank of the further cantilevered component;
   wherein the first wing is adhered to the cantilevered component with a stronger bond than the second wing is adhered to the further cantilevered component.

2. The method according to claim 1, wherein the adhesive carrier has a base connecting the first and second wings.

3. The method according to claim 1, wherein the cantilevered component is a blade mounted to the hub.

4. The method according to claim 3, wherein the blade is integrally mounted to the hub.

5. The method according to claim 1, wherein adhesive is applied over a majority of the area of the second surface of at least one of the wings.

6. The method according to claim 1, wherein the second surface of at least one of the wings has pockets configured to receive adhesive.

7. The method according to claim 2, wherein the base of the adhesive carrier is positioned directly between the cantilevered component and the further cantilevered component.

8. A method of supporting a cantilevered component during machining of the cantilevered component, wherein the cantilevered component is mounted on a hub and has a leading edge, a trailing edge and a first flank connecting the leading edge and the trailing edge and a second flank connecting the leading edge and the trailing edge, the first flank facing a second flank of a further cantilevered component, the method comprising the steps of:
   providing an adhesive carrier, the adhesive carrier being rigid and comprising a first wing shaped to adhere directly to the first flank of the cantilevered component and a second wing shaped to adhere directly to the second flank of the further cantilevered component;
   wherein the adhesive carrier is "V" shaped with each wing having a surface that faces the other wing and each wing having a second surface facing away from the other wing, the second surface of the second wing fitting directly against the second flank of the further cantilevered component; and
   applying adhesive to the adhesive carrier and adhering the adhesive carrier to the cantilevered component and the further cantilevered component; and
   allowing the adhesive to cure such that the second surface of the first wing is adhered directly to the first flank of the cantilevered component and the second surface of the second wing is adhered directly to the second flank of the further cantilevered component;
   wherein the first wing is adhered to the cantilevered component with a stronger bond than the second wing is adhered to the further cantilevered component.

* * * * *